Patented Aug. 23, 1949

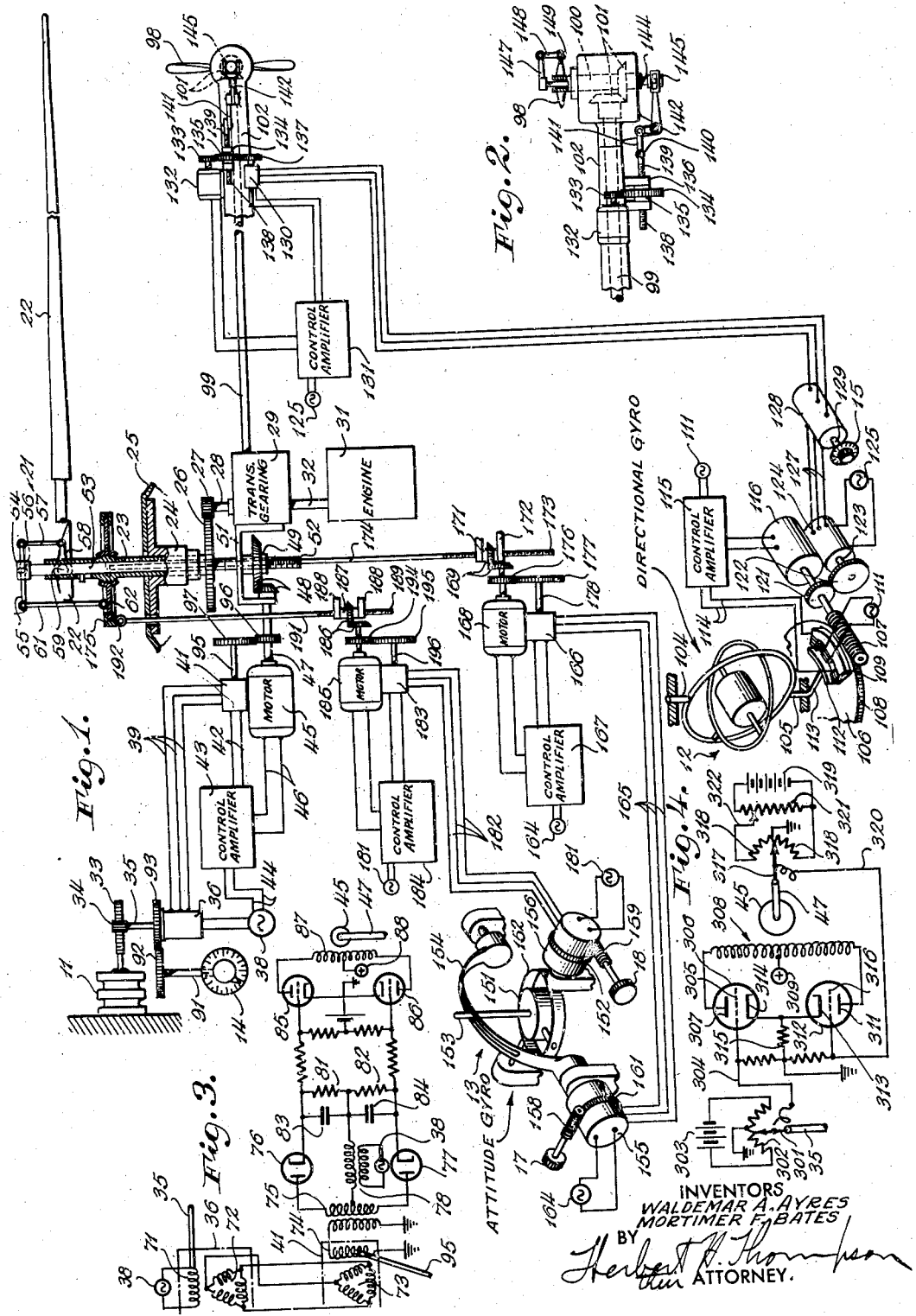

2,479,549

UNITED STATES PATENT OFFICE 2,479,549

AUTOMATIC PILOT FOR HELICOPTERS

Waldemar A. Ayres, Kew Gardens Hills, and Mortimer F. Bates, Brooklyn, N. Y., assignors to The Sperry Corporation, a corporation of Delaware Application November 10, 1943, Serial No. 509,734

1 Claim. (Cl. 244—17.13)

This invention relates generally to an automatic pilot for aircraft and particularly concerns automatic control of an aircraft having a sustaining propeller or rotating wings. The invention is particularly useful for automatic control of helicopters and is described herein as applied to a helicopter of the single rotor type having an off-set torque compensating propeller.

According to the present invention the lift characteristic of the sustaining propeller is controlled to correct for the displacement of the aircraft from a predetermined attitude. This displacement may be occasioned by aerodynamic instability of the aircraft or may be introduced intentionally by changing the reference attitude. In addition to stabilizing the aircraft in a selected attitude, the thrust axis of the sustaining propeller may be adjusted to control the horizontal component of thrust thereby controlling horizontal movement of the aircraft.

Horizontal movement may be combined with vertical movement by changing the collective pitch of the rotating wings that sustain the craft in the air. Adjustment of the lift is controlled by an altitude sensitive device which may be set for a selected altitude. It then controls mechanism for changing a collective pitch of the sustaining wings to move the aircraft toward the selected altitude and then controls the lift in a manner to maintain the aircraft at that altitude.

These controls for changing the lift and the lift characteristic of the sustaining propeller may also change its torque. In order to prevent this change in torque from causing rotation of the aircraft about the axis of the sustaining propeller, it is necessary to change the pitch of the torque compensating propeller which determines the heading of the aircraft. A directional instrument such as a gyroscope controls the thrust of the torque compensating propeller to maintain a predetermined heading of the aircraft. If a change in the torque of the sustaining propeller causes the aircraft to begin to turn, the torque compensating propeller will be actuated by the directional instrument in a manner to return the aircraft to its original heading and maintain it at such heading. The directional instrument may be adjusted manually to maintain the heading of the craft in any desired direction.

The direction of horizontal motion of the aircraft is determined by two factors, namely, the heading of the aircraft and the position of the thrust axis of the sustaining propeller relative to the aircraft. As is well known, a helicopter may be moved horizontally in any direction, that is, forward, backward or laterally. The direction of motion is determined not only by the heading of the craft but also by the horizontal movement of the aircraft relative to its heading. If it is desired to proceed along a certain course, the heading may be set along that course or at a specific angle relative thereto. An adjustment of the attitude control device may cause the thrust axis of the sustaining propeller to have a forward horizontal component or to have the horizontal component at a specific angle relative to the fore and aft axis of the aircraft. In both cases, the direction of motion is determined jointly by the attitude device and the directional instrument.

A major object of the invention is to provide an automatic pilot for an aircraft having a sustaining propeller, for maintaining the aircraft at a predetermined altitude, in a predetermined attitude and on a predetermined course.

Another object of the invention is to provide an automatic pilot for an aircraft having a sustaining propeller in which the aircraft is maintained at a predetermined attitude by automatic control of the lift characteristic of the sustaining propeller.

A further object of the invention is to provide an automatic pilot for a helicopter in which horizontal motion is controlled by an attitude sensitive device that adjusts the horizontal component of the thrust axis of a sustaining propeller.

A further object of the invention is to provide an automatic pilot for a helicopter in which the direction of motion is controlled jointly by heading and attitude sensitive devices.

A further object of the invention is to provide an automatic pilot for an aircraft having a sustaining propeller in which a directional instrument is used to control the action of a torque compensator for controlling the heading of the aircraft.

A further object of the invention is to provide an automatic pilot for an aircraft having a sustaining propeller in which an altitude sensitive device controls the collective pitch of the sustaining propeller in a manner to automatically move the aircraft toward or maintain it at a predetermined altitude.

A further object of the invention is to provide an automatic pilot for a helicopter in which the lift of a sustaining propeller is controlled by an altitude sensitive device to maintain the aircraft at a predetermined altitude and changes in torque of the sustaining propeller are automatically compensated by a torque compensator under the control of a directional instrument.

A still further object of the invention is to provide automatic pilot for a helicopter in which horizontal and vertical components of motion are controlled by changes in the lift characteristic and the lift of a sustaining propeller by attitude and altitude sensitive devices, respectively.

Other objects and advantages of the invention will become apparent from the following specification, taken in connection with the accompanying drawings, wherein Fig. 1 is a schematic diagram of an automatic pilot embodying the invention as applied to a single rotor helicopter having a torque compensating propeller, some of the parts being shown in section and others in perspective, for purposes of clearness;

Fig. 2 is a partial top plan view of the control apparatus for the torque compensating propeller shown in Fig. 1;

Fig. 3 is a wiring diagram illustrating one circuit arrangement for the follow-up control circuits of Fig. 1; and Fig. 4 is a wiring diagram illustrating another circuit arrangement for the follow-up control circuits of Fig. 1.

The automatic pilot as shown in Fig. 1 includes an altitude sensitive device such as aneroid bellows 11, a directional instrument in the form of a directional gyroscope 12, and an attitude sensitive device shown as a vertical gyro or gyro horizon 13. The altitude sensitive device includes an adjusting control knob 14 for setting a predetermined altitude into the automatic pilot, which then controls the aircraft to maintain it at that altitude.

A directional control knob 15 may be set for a selected heading of the aircraft which preferably corresponds to an angular displacement between the longitudinal axis of the aircraft and the directional axis of the gyroscope. The attitude control 13 includes two adjusting knobs 17 and 18 for setting components of a selected attitude into the automatic pilot. These components preferably correspond to roll and pitch settings, that is angular components about the longitudinal and athwartship axes of the aircraft, respectively.

A sustaining propeller 21 for the aircraft includes blades or rotating wings 22, 22 supported on a shaft 23 rotatable in a bearing 24 carried by a portion of the fuselage 25 of the aircraft. In the case of a helicopter, the sustaining propeller is power driven as by a gear 26 on the shaft 23 which meshes with a pinion 27 carried by a shaft 28 from a gear box or transmission 29. A suitable power plant 31, such as an internal combustion engine, drives through shaft 32 to the transmission 29 for driving the sustaining propeller 21.

In order to produce vertical movement of the aircraft, the collective pitch of the wings 22 is increased or decreased to cause the aircraft to ascend or descend. The lift of the sustaining propeller is automatically controlled by the position of aneroid bellows 11 which depends upon the altitude of the aircraft and the position of altitude control knob 14 that may be set manually for a selected altitude. The bellows 11 operates through a rack 33 and pinion 34 to rotate shaft 35 which positions the rotor of a suitable transmitter or rotary transformer 36 that may be of any suitable type, such as a "Selsyn" or "Telegon." This rotor winding may be connected in a conventional manner to a source of alternating current potential 38. The stator winding of the signal generator 36 may be connected as by leads 39, 39 to stator winding of a corresponding receiver or rotary transformer 41 which is also of a conventional type.

In the case of a "Selsyn" or "Telegon," a voltage is induced in the rotor winding of the receiver 41, displaced in phase according to the angular displacement of the rotor windings in the signal transmitter 36 and the receiver 41 relative to their respective stator windings. The rotor winding of the receiver 41 may be connected as by leads 42 to a control amplifier 43 which is also of conventional design, including a phase detector for producing a voltage corresponding to the direction and amount of phase displacement between the voltage induced in the rotor winding of the receiver 41 and the voltage of the source 38, the latter being connected to the control amplifier as by leads 44. The voltage thus produced operates through an amplifier circuit to control the currents in the field windings of a motor 45 which are connected by leads 46 to the control amplifier 43. In this manner, the motor 45 turns in a direction and at a rate corresponding to the direction and amount of the phase displacement of two voltages which corresponds to the displacement of the rotors in the transmitter 36 and the receiver 41 from a synchronous position.

The motor 45 rotates a shaft 47 which drives through gearing 48 to rotate a nut 49 supported in a bracket 51 that is fixed to the body of the aircraft. The nut 49 engages a threaded rod 52 arranged to move a shaft 53 up or down, depending upon the direction of rotation of the nut 49. The shaft 53 rotates with the propeller 21 and has a cap portion 54 on which a lever 55 is pivoted as at 56. One end of the lever 55 is pivotally connected to a link 57 which is connected to a crank 58 mounted on the support for one of the blades 22.

The blades or rotating wings 22, 22 are pivotally mounted as at 59 for rotation about a horizontal axis extending radially from the supporting shaft 23. The opposite end of the lever 55 is attached to a link 61 which is connected to a wobble plate 62 that is adjustably positioned to cyclically vary the pitch of the blades 22, 22 as they are rotated by the shaft 23 to change the lift characteristic of the sustaining propeller, as will subsequently be explained in greater detail.

From the foregoing description, it will be apparent that movement of the shaft 53 either upwardly or downwardly causes crank 58 to change the pitch of the propeller blades 22. Although not shown herein, it is the usual practice to change the engine throttle simultaneously with the pitch of the propeller blades so as to maintain the rotor speed substantially constant when the pitch of the propeller is increased, and vice versa. Although the details are not shown in the drawings, any desired number of blades may be connected in a similar manner to simultaneously change the pitch of all of them by movement of the shaft 53.

As previously stated, the transmitter 36 and the receiver 41 may be of any suitable type to form a transmission system for actuating amplifier 43 to control the motor 45. One arrangement of a follow-up circuit for this purpose is shown diagrammatically in Fig. 3, in which the source 38 is connected to rotor winding 71 of the transmitter 36 and stator winding 72 is connected to stator winding 73 of the receiver 41. The voltage of receiver rotor winding 74 may be supplied through a suitable transformer 75 in phase opposition to phase detecting tubes 76 and 77. The voltage of source 38 is supplied through a transformer 78 in like phase to the phase detecting tubes 76 and 77.

According to the known characteristics of this type of circuit, a voltage is produced across load resistors 81 and 82, that are shunted by condensers 83, 84 having a direct current component corresponding to the phase displacement between the voltage supplied by the rotor winding 74 and the voltage of the source 38. This voltage is applied to grids of amplifying tubes 85 and 86, the plates of which are connected through opposite halves of field winding 87 of the motor 45 to a source 88 of positive potential.

The polarity and magnitude of the voltage across load resistors 81 and 82 thus determines the direction and magnitude of the differential current in the two halves of field winding 87 which controls the direction and speed of the motor 45. Therefore, the motor is controlled according to the phase displacement between the voltage supplied by rotor winding 74 and the voltage of the source 38 which corresponds to the displacement of the rotor windings 71 and 74 from a synchronous position.

Altitude control knob 14 may be turned to rotate shaft 91 which drives through gearing 92 and 93 to turn the casing of the transmitter 36 that carries the stator winding 72. Assuming the transmitter 36 and receiver 41 have their respective rotor windings in a synchronous position, the motor 45 positions rod 52 to adjust the pitch of the sustaining propeller 21 so the vertical thrust of the propeller approximately corresponds to the weight of the aircraft to maintain it at a substantially constant altitude. Either a change in the selected altitude by adjustment of the control knob 14, or movement of the bellows 11 by a change in the altitude of the aircraft will change the relative position of the rotor and stator windings 71 and 72 in the transmitter 36. This will cause a phase displacement between the voltage of the rotor windings 74 in the receiver 41 and the voltage of the source 38. This phase displacement actuates the phase detecting and amplifying circuits to produce a differential current in the two halves of field winding 87, thereby causing the motor 45 to rotate.

Rotation of the motor 45 changes the pitch of the sustaining propeller blades 22, 22 by movement of the shaft 53. The amount of this change corresponds to the phase displacement of the voltages since the motor 45 continues to operate until the rotor winding 74, which is positioned by the motor 45 through gearing 96 and 97 and shaft 95, reaches a position synchronous with that of the rotor winding 71 in the transmitter 36.

When the motor 45 has changed the pitch of the sustaining propeller blades, the aircraft will begin to ascend or descend, thereby causing the bellows 11 to change the position of the rotor of signal transmitter 36 as the aircraft changes altitude. This change in the position of the transmitter rotor creates an opposite phase displacement in the transmission system which drives the motor 45 in the opposite direction to gradually return the blades 22, 22 to their original position as the aircraft reaches the altitude set by dial 14.

From the above description of the control circuit in Fig. 3, it will be apparent that movement of the bellows causes a proportional change in the pitch of the sustaining propeller.

Another type of control circuit that may be used to adjust the pitch of the sustaining propeller according to the displacement of the aircraft from a predetermined attitude is shown in Fig. 4. The shaft 35, actuated by the bellows 11, may be connected to a slider 301 on potentiometer 302, having its center point connected to ground and a suitable voltage source such as battery 303 applied across its terminals. As the shaft 35 moves the potentiometer slider 301, the voltage of the slider as represented by a lead 304 will become positive or negative with respect to ground. The polarity and magnitude of this voltage depends upon the direction and magnitude of the displacement of the slider 301 along the potentiometer 302.

The potentiometer 302 may be considered as mounted in a housing, which is adjustable in a similar manner to the housing of the transmitter 36 for a predetermined altitude. The lead 304 is connected to a grid 305 of tube 306 having its plate 307 connected through one-half of a field winding 308 for the motor 45 to a source 309 of positive potential. The source 309 is also connected through the other half of the winding 308 to a plate 311 of tube 312, having its cathode 313 connected to cathode 314 of the tube 306. Tubes 306 and 312 are connected in a differential amplifier circuit having their cathodes connected through a common cathode bias resistor 315 to ground. The voltage of grid 316 of the tube 312 is controlled by a lead 320 connected to a slider 317 on potentiometer 318 which also has its center point connected to ground.

A variable voltage may be supplied, from a source such as battery 319 through a potentiometer 321 having an adjustable slider 322, across the terminals of potentiometer 318.

When the voltage of leads 304 and 320 are equal, as determined by the positions of sliders 301 and 317, equal currents will flow through the two halves of the field winding 308, so their magnetic flux will cancel and the armature of the motor 45 will remain stationary. As relative movement is introduced between the shafts 35 and 47, the voltages of the potentiometer sliders applied to the grids of the two tubes will be unequal, causing unequal currents to flow through the two halves of field winding 308. This will result in the motor 45 turning the shaft 47 in one direction or another and at a rate depending upon the direction and magnitude of the displacement between the two shafts. As the shaft 47 turns, it adjusts the position of potentiometer slider 317 to match that of the potentiometer slider 301. In this manner, the potentiometer slider 317 acts as a follow-up, so displacement of the shaft 35 from a neutral position will produce a proportional displacement of the shaft 47 driven by the motor 35.

The ratio of the movement of the shaft 47 for a given movement of the shaft 45 is determined by the position of potentiometer slider 322 which controls the voltage applied across the terminal of potentiometer 318. If the voltage applied across potentiometer 318 is equal to that across potentiometer 302, as determined by battery 303, a given movement of the shaft 35 will cause the motor 45 to move the shaft 47 the same amount. Thus the system will operate as a follow-up mechanism having a one to one follow-up ratio.

However, if the voltage applied to the potentiometer 318 is made greater or less than that applied to the potentiometer 302, the potentiometer slider 317 will be moved a smaller or greater amount by the shaft 47 for a given movement of the potentiometer slider 301 by the shaft 35. Thus the follow-up ratio of the system may be varied in any desired manner by adjustment of the potentiometer slider 322 to vary the voltage applied across the terminals of the potentiometer 318.

Although two specific control circuits have been illustrated and described, it is contemplated that any desired type of control circuits may be used to operate the pitch mechanism from the altitude sensitive device without departing from the invention.

The mechanism for changing the pitch of the sustaining propeller is, of course, provided with suitable limit stops for the blades so maximum and minimum angles of attack are not exceeded. The altitude control apparatus is so arranged that for changes in altitude exceeding a definite amount, for example, 100 or 200 feet, the pitch of the sustaining propeller will be adjusted to its maximum or minimum angle of attack. For smaller changes in altitude, the angle of attack depends upon the change desired so the vertical velocity will be commensurate with the distance to be traveled.

In order to prevent the torque of the shaft 23, which drives the sustaining propeller 21, from rotating the aircraft about the axis of the shaft 23, a torque compensating propeller 98 is also driven from transmission 29 as by a shaft 99 which drives through gearing 101. A housing 102 extending from the aircraft supports the torque compensating propeller in an offset position relative to the axis of the sustaining propeller 21. The torque compensating propeller 98 has a horizontal thrust which, assuming a constant angular velocity, depends upon the pitch of the propeller 98.

As the pitch of the sustaining propeller is adjusted to change or maintain the aircraft's altitude, the torque of the shaft 23 may also be changed. Unless the pitch of the torque compensating propeller 98 is then adjusted, the aircraft will begin to turn due to the torque differential exerted upon the aircraft by the shaft 23 and the compensating propeller 98.

In order to avoid this difficulty and also to maintain a constant heading for the aircraft regardless of other influencing forces, a directional instrument such as the directional gyro 12 is employed to automatically control the pitch of the torque compensating propeller 98 so the aircraft will at all times maintain a selected heading.

A directional instrument such as a directional gyro 12 of a conventional type including appropriate flux gates, or a meridian seeking gyro is supported for movement about a vertical axis as by shafts 104 and 105. A conventional follow-up such as a base 106 is actuated by a worm 107 which meshes with a worm gear 108 to maintain the position of the base aligned with that of the gyro regardless of movements of the aircraft. This is accomplished by a conventional pick-off which includes an E transformer that has its center leg energized by a winding connected to a suitable source 111 of alternating current. Windings around the other two legs of the E-shaped core of the transformer 109 are connected in series.

The voltages induced in these two series windings are controlled by the position of an armature 112 which is mounted by an arm 113 extending from the shaft 105. Movement of this armature 112 relative to the core of the transformer induces a differential voltage in the windings on the outside legs which is reversible in phase and variable in magnitude, depending on the direction and amount of displacement of armature 112 relative to the core of the transformer. This voltage is supplied as by leads 114 to a conventional control amplifier 115 which may be similar to the control amplifier 43 shown in detail in Figure 3.

The amplifier 115 controls the current in the field windings of a motor 116 which rotates the worm 107. It will be apparent that displacement of the base 106 relative to the reference position of the gyro causes a differential voltage from the E transformer to operate through amplifier 115 to actuate motor 116 in a manner which moves the transformer 109 to reduce the said displacement. This follow-up apparatus thereby constantly maintains the base 106 in a position substantially identical with that of the gyro and thus defines a reference direction. A gear 121 is also driven by a motor 116 to rotate a gear 122 which drives through shaft 123 to position the rotor winding of a transmitter 124 which may be similar to the transmitter 36 previously described in connection with the altitude control. The gears 121 and 122 are driven synchronously with the base 106 so their positions as well as the position of the rotor winding of the transmitter 124 at all times correspond to the position of the directional gyro. This rotor winding may be energized from a suitable source 125 of alternating current and the stator winding of the transmitter 124 may be connected as by lead 127 to one of a pair of three phase windings in a rotary transformer 128.

The rotary transformer 128 may be of any suitable design having a pair of three phase windings, one of which is rotatable relative to the other as by a shaft 129 carrying the course setting knob 15. The remaining winding of the rotary transformer 128 is connected to the stator winding of a receiver 130. The receiver 130 has its rotor winding connected to control amplifier 131 which is similar to the control amplifier 43 described in connection with Fig. 3, and controls the currents in opposite halves of the field windings of a motor 132 that is mounted on the housing 102.

The motor 132 drives through gearing 133, 134 which rotates a nut 135, carried by a bracket 136 also mounted on the housing 102. The nut 135 engages the threaded portion 138 of a rod 139 that is connected by a link 141 to one arm of a bell crank lever 142 the other arm of which is attached by a suitable coupling 145 to a rod 144 extending through the driving shaft 100 for the propeller 98. The bell crank 142 is pivotally mounted at 140 on the housing 102. The coupling 145 permits rotation of the rod 144 with the propeller 98, but is secured to the rod in a manner whereby rotation of the bell crank lever 142 about its pivot, causes longitudinal movement of the rod 144.

The blades of the torque compensating propeller 98 are pivotally mounted on driving shaft 100 for adjustment of the propeller's pitch. An arm 147 on the end of the rod 144 is connected by a link 148 to a crank 149 on the propeller 98 so longitudinal movement of the rod 144 changes the pitch of the propeller 98.

The heading control circuit and mechanism described adjusts the pitch of the torque compensating propeller to maintain the craft at a desired heading as determined by the position of control knob 15. This knob positions the rotor winding of the rotary transformer 128 which acts as a differential in the transmission system between the transmitter 124 and the receiver 130. The position of the rotary winding of the transformer 128 introduces an angular displacement between the position of the directional instrument as determined by the transmitter 124 and a selected course. Obviously a similar result may be obtained by adjusting the casing of the transmitter 124 to introduce any desired angular displacement between the selected course and the position of the directional gyro 12.

The motor 132 is driven according to positional disagreement between the aircraft and the desired heading as determined by direction control knob 15. In this manner it operates to adjust the pitch of torque compensating propeller 98 in a manner which turns the aircraft toward a desired heading. Appropriate limit stops are provided for maximum and minimum angles of attack for the propeller. If there is a large displacement of the aircraft from a selected heading it causes the propeller 98 to change to its maximum or minimum pitch. As the aircraft approaches the desired heading, or when it is displaced only a small amount from the desired heading, the motor drives in the opposite direction to slowly return the propeller 98 toward its normal pitch angle.

The gyro vertical 13 performs a dual function in controlling the attitude of the aircraft. It acts as an attitude sensitive device to change the lift characteristic of the sustaining propeller to maintain a predetermined attitude of the aircraft. It also may be adjusted to cause the aircraft to assume a selected attitude thereby changing the position of the thrust axis of the sustaining propeller to introduce a horizontal thrust component and cause horizontal motion of the aircraft. The direction and amount of this horizontal motion is determined by the attitude at which the gyro vertical controls the aircraft.

The gyro vertical 13 may be of conventional design which includes a rotor 151, mounted in a gimbal 152 for movement about two axes. A shaft 153 projects from the gyro rotor 151, moving a bail 154 according to relative movement of the aircraft relative to the gyro about one axis. Movement of the bail 154 turns a rotor winding of a pickoff or transmitter 155 which is of conventional design and may be similar to the transmitter 36 previously described. Movement of the aircraft about a second axis causes the gimbal 152 to turn a rotor winding of a second pickoff or transmitter 156 that is also of a conventional type such as the transmitter 36 previously described.

The housings of the transmitters 155 and 156 are adjustable by turning attitude control knobs 17 and 18 which operate through worms 158 and 159 that engage worm gears 161 and 162 on the transmitters 155 and 156, respectively. The position of the stator windings carried by the housings of these transmitters determines the attitude of the aircraft.

The rotor winding of the transmitter 155 may be connected to a suitable source 164 of alternating current and the stator winding of that transmitter may be connected as by leads 165 to a corresponding stator winding of a receiver 166 that may be similar to the receiver 41. The rotor winding of the receiver 166 is connected to a control amplifier 167 which may be similar to the amplifier 43 described and shown in detail in Fig. 3. The amplifier 167 controls a motor 168 according to the positions of the rotors of transmitter 155 and receiver 166 relative to their respective stator windings. The motor 168 operates through gearing 169 to rotate a nut 171, carried in a bracket 172 fixed to the body of the aircraft. Nut 171 engages a threaded portion 173 of a rod 174 which is pivotally connected to a guide 175 for the wobble plate 62 that is preferably mounted as by a ball joint, for universal movement on the shaft 23.

Movement of the rod 174 changes the lift characteristic of the sustaining propeller to change the attitude of the aircraft. The motor 168 also drives through gearing 176 and 177 to rotate shaft 178 which positions the rotor winding of the receiver 166 according to the movement of the rod 174. The displacement of this rod therefore depends upon the displacement of the aircraft from the reference attitude which is predetermined by adjustment of control knob 17 which positions the stator winding of transmitter 155.

In a similar manner, the rotor winding of the transmitter 156 may be connected to a suitable source 181 of alternating current potential and its stator connected as by leads 182 to the stator winding of a receiver 183. The receiver 183 has its rotor winding connected to control amplifier 184 in a manner similar to that shown in Fig. 3, for the amplifier 43. The amplifier 184 controls the current in opposite halves of the field winding of a motor 185 that drives through gearing 186 to rotate a nut 187 carried by bracket 188 which is fixed to the body of the aircraft. The nut 187 engages a threaded portion 189 of a rod 191 that is pivotally connected at 192 to the guide 175 for adjusting the lift characteristic of the sustaining propeller by positioning wobble plate 62.

The motor 185 also drives through gearing 194 and 195 to rotate shaft 196 which positions the rotor winding of the receiver 183. Since control of the motor 185 depends upon the relative position of transmitter and receiver, it operates as a follow-up to position the rod 191 according to the displacement of the aircraft from the predetermined reference attitude.

Control of the lift characteristic of the propeller is effected by the position of the wobble plate to change the attitude of the aircraft in the following manner. The rods 174 and 191 are pivoted to the guide 175 at points spaced by approximately 90°, whereby movement of these rods causes movement of the wobble plate 62 about two substantially perpendicular axes that may correspond to lateral and longitudinal axes of the aircraft.

In an aircraft having a single sustaining propeller, the lift characteristic is usually controlled by cyclically varying the lift of the propeller blades individually during each revolution of the propeller. For example, if the rod 191 is raised, and the rod 174 remains in its neutral position, the link 61 is moved up and down as the wobble plate 62 rotates in the guide 175. This movement of the link 61 operates through the lever 55 to oscillate the blade 22 about its horizontal radial axis during each revolution of the propeller, thereby causing the blade to have a larger angle of attack, that is a greater pitch during one half of each revolution and a smaller angle of attack during the other half of each revolution. This adds a force couple to the normal vertical thrust of the sustaining propeller, that causes it to turn about a horizontal axis, the direction of the axis being dependent upon the position of the wobble plate 62. As the propeller begins to rotate about the horizontal axis, it rotates the entire aircraft thereby effecting a change in its attitude.

Since the position of the wobble plate is controlled by follow-up circuits, according to the displacement of the aircraft relative to a predetermined or reference attitude, as determined by the gyro vertical 13, it changes the lift characteristic of the sustaining propeller in a manner to return the aircraft, by rotating it about a horizontal axis, to said predetermined attitude.

Under some circumstances it may be desirable to change the response ratio of the change in the pitch characteristic to the displacement of the craft from the reference attitude. To accomplish this, potentiometers may be used for pickoffs on the gyro vertical instead of the synchrotransmitters 155 and 156. By arranging the potentiometers in a circuit such as that shown in Fig. 4, the response ratio of the control circuits is adjustable by changing the voltage applied across one of the potentiometers.

As in the case of the other controls, suitable limit stops must be provided for maximum and minimum pitch angles of the propeller blades. For large changes in attitude, the pitch angle of the blades is changed a maximum amount to introduce a maximum permissible change in the lift characteristic of the sustaining propeller. As the displacement between the aircraft and its reference attitude becomes smaller, the motors 168 and 185 are actuated by the follow-up circuits described to reduce the change in the lift characteristic. When the attitude of the aircraft corresponds to the reference attitude, the motors will have returned the wobble plate to its neutral position. By this arrangement, the aircraft is stabilized in a predetermined attitude of flight.

In a helicopter, horizontal motion of the aircraft is controlled primarily by the position of the thrust axis of the sustaining propeller. To cause horizontal motion of the aircraft, a horizontal component of the thrust axis is introduced in a direction corresponding to the motion desired. The speed of this horizontal motion depends upon the amplitude of the horizontal component of thrust. When the motion of the aircraft includes a horizontal component, the attitude of the craft changes so it tilts in the direction of motion.

Since the attitude of the aircraft has a definite relation to the direction and speed of horizontal motion, it is possible, by setting the attitude control for a predetermined attitude, to cause the aircraft to assume a desired horizontal motion. For these reasons the direction and speed of horizontal motion of the aircraft may be controlled by appropriate setting of attitude control knobs 17 and 18. Thus, the gyro vertical 13 serves to stabilize the aircraft at a specific attitude and, furthermore, serves as a control of the direction and speed of motion of the aircraft. The stabilization is effected by changing the lift characteristic of the sustaining propeller so the aircraft remains in a predetermined attitude. The horizontal motion is controlled by causing the aircraft to assume a specific attitude at which the thrust of the sustaining propeller includes a horizontal component in a direction and a magnitude corresponding to the desired direction and speed of the aircraft.

When horizontal motion is initiated by changing the attitude control knobs 17 and 18, the vertical component of thrust, is also changed. It is necessary, therefore, to compensate this change in vertical thrust in order to prevent the aircraft from changing altitude when horizontal motion is effected.

If the aircraft deviates from the altitude set into the automatic pilot by control knob 14, a signal will be produced by the aneroid bellows 11, which will operate a motor 45 to move shaft 53, causing a change in the pitch of all of the propeller blades, thereby changing the lift of the sustaining propeller. This action is effective to maintain the aircraft at a substantially constant altitude, since it operates upon a small deviation from the desired altitude.

In addition to changing the vertical thrust component a change in the attitude of the aircraft to cause horizontal motion may also result in a change in the torque of the sustaining propeller. As has been previously mentioned, this would cause rotation of the aircraft unless the torque compensating propeller is properly adjusted. If the aircraft rotates due to such a change in torque, it begins to deviate from the desired heading set by direction control knob 15. Displacement from the desired heading causes the motor 132 to change the pitch of propeller 98 in a manner to return the aircraft to the desired heading, thereby compensating for a change in torque of the sustaining propeller.

If for some reason the torque applied to the sustaining propeller fails, the automatic pilot operating through the directional control instrument will adjust the torque compensating propeller. This prevents the body of the aircraft from rotating during its descent to a landing.

Although the directional control determines the heading of the aircraft, it may move in any direction relative to that heading. Therefore, the direction of motion is dependent upon the direction of the horizontal thrust component of the sustaining propeller, as well as upon the heading of the aircraft. For this reason the directional gyro and the gyro vertical operate jointly to control the direction of motion of the aircraft. A change in either of these controls will change the direction of motion. It is usually desirable to cause the aircraft to travel in the direction of its heading. Therefore, the attitude device would normally be adjusted to cause forward movement of the aircraft and the direction control knob 15 adjusted to the desired course of the aircraft.

The automatic pilot described herein operates to completely automatically control flight of an aircraft having a sustaining propeller. The controls of the automatic pilot may be arranged to determine the altitude, attitude, and heading of the aircraft. Although each of these are necessary for completely automatic control of the aircraft, they may be used separately. For example, the gyro vertical may be used to stabilize and control the horizontal motion of the aircraft and manually operated controls may be used to adjust the altitude and heading of the aircraft. Similarly, either the altitude control or the directional control might be used independently without departing from the intended scope of the invention. It is also contemplated that this invention may be used for automatic control of an aircraft having more than one sustaining propeller.

Although the automatic pilot described herein is electrically operated, it will be apparent that equivalent hydraulic or mechanical controls may be substituted for any or all of the electrical controls. The particular mechanism for changing the lift, and lift characteristic of the sustaining propeller may also be modified without departing from the invention. If desired, the automatic pilot may be rendered inoperative by opening power circuits to the motors and control circuits, and the aircraft operated by manual controls.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

In an automatic pilot for an aircraft having a sustaining propeller, apparatus for controlling the attitude of said aircraft comprising a gyro for defining a reference attitude, and control mechanism actuated by said gyro responsive to displacement of said aircraft relative to said reference attitude for changing the lift characteristic of said propeller according to said displacement, said control mechanism including adjustable means for changing the response ratio of said propeller to said displacement.

WALDEMAR A. AYRES.
MORTIMER F. BATES.

REFERENCES CITED

The following references are of record in the file of this patent:

UNITED STATES PATENTS

| Number | Name | Date |
| --- | --- | --- |
| 1,896,805 | Sperry, Jr., et al. | Feb. 7, 1933 |
| 1,918,082 | Carlson | July 11, 1933 |
| 1,993,701 | Avery | Mar. 5, 1935 |
| 1,997,412 | Fischel | Apr. 9, 1935 |
| 2,023,105 | Smith | Dec. 3, 1935 |
| 2,045,579 | Carlson | June 30, 1936 |
| 2,112,965 | Koster | Apr. 5, 1938 |
| 2,143,140 | Carlson | Jan. 10, 1939 |
| 2,190,390 | Thiry | Feb. 13, 1940 |
| 2,191,250 | Fischel | Feb. 20, 1940 |
| 2,350,126 | Pitcairn | May 30, 1944 |